(12) United States Patent
Plischke et al.

(10) Patent No.: US 7,465,430 B2
(45) Date of Patent: Dec. 16, 2008

(54) APPARATUS FOR MAKING METAL OXIDE NANOPOWDER

(75) Inventors: Juergen Kurt Plischke, Bear, DE (US); Stephan Claude De La Veaux, Wilmington, DE (US); Scott Rickbeil Frerichs, Hockessin, DE (US); Jodi Lynn Witt, New Castle, DE (US); Christian Normand, Quebec (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 630 days.

(21) Appl. No.: 11/183,725

(22) Filed: Jul. 18, 2005

(65) Prior Publication Data
US 2007/0292321 A1 Dec. 20, 2007

Related U.S. Application Data

(60) Provisional application No. 60/589,238, filed on Jul. 20, 2004.

(51) Int. Cl.
- *B01J 19/00* (2006.01)
- *C09C 1/00* (2006.01)
- *C09C 1/36* (2006.01)
- *C01G 23/047* (2006.01)

(52) U.S. Cl. ............. 422/198; 422/158; 423/613; 106/437; 106/442; 977/842; 977/844; 977/846; 977/891

(58) Field of Classification Search .......... 422/198, 422/190, 158, 130; 423/613, 447.2, 447.3; 106/437, 442; 118/719; 55/338; 977/842, 977/891, 846, 844
See application file for complete search history.

(56) References Cited

U.S. PATENT DOCUMENTS 3,069,281 A * 12/1962 Wilson ............... 106/437

(Continued)

FOREIGN PATENT DOCUMENTS

DE 2028599 1/1971

(Continued)

OTHER PUBLICATIONS

European Search Report.

*Primary Examiner*—Glenn Caldarola
*Assistant Examiner*—Huy-Tram Nguyen (57) ABSTRACT

There is described an apparatus for making metal oxide particles which are substantially free of coarse tail from an oxidizing agent and a metal reactant in a flow reactor. The apparatus can be a concentric tubular flow reactor comprising a substantially funnel-shaped reactant contacting region located adjacent to a reaction zone which is able to direct a flow of a hot oxidizing agent towards a flow of the metal reactant to form a reaction stream which flows downstream into a reaction zone, whereby the hot oxidizing agent of the reaction stream is able to surround the flow of metal reactant sufficient to prevent the metal reactant from contacting the wall of the reactant contacting region and forming scale on the wall. A cooling fluid conduit being able to direct a flow of a cooling fluid into the reaction zone to flow coaxially with the reaction stream and to form a fluid curtain between the reaction stream and a baffle, which defines at least a portion of the reaction zone, while the metal reactant and hot oxidizing agent within the reaction stream react to form the metal oxide nanopowder prevents scale from forming on the baffle.

9 Claims, 6 Drawing Sheets

U.S. PATENT DOCUMENTS

| | | | |
|---|---|---|---|
| 3,443,897 A * | 5/1969 | Hoekje et al. | 423/337 |
| 3,449,072 A | 6/1969 | Freeman | |
| 3,586,489 A | 6/1971 | Hilgers et al. | |
| 3,642,521 A | 2/1972 | Moltzan et al. | |
| 3,735,000 A | 5/1973 | Calcagno et al. | |
| 3,764,667 A | 10/1973 | Thring et al. | |
| 4,048,290 A | 9/1977 | Lee | |
| 4,786,490 A * | 11/1988 | Yoshida et al. | 423/636 |
| 4,803,056 A | 2/1989 | Morris et al. | |
| 5,200,595 A | 4/1993 | Boulos et al. | |
| 5,749,937 A | 5/1998 | Detering et al. | |
| 5,788,738 A | 8/1998 | Pirzada et al. | |
| 5,874,134 A | 2/1999 | Rao et al. | |
| 5,935,293 A | 8/1999 | Detering et al. | |
| 6,110,544 A | 8/2000 | Yang et al. | |
| 6,207,131 B1 | 3/2001 | Magyar et al. | |
| 6,277,354 B1 | 8/2001 | Becker et al. | |
| 6,350,427 B1 * | 2/2002 | Yuill et al. | 423/613 |
| 6,379,419 B1 | 4/2002 | Celik et al. | |
| 6,419,893 B1 | 7/2002 | Yuill et al. | |
| 6,693,253 B2 | 2/2004 | Boulos et al. | |
| 2002/0004029 A1 | 1/2002 | Jang et al. | |
| 2002/0035950 A1 | 3/2002 | Mangold et al. | |
| 2002/0155059 A1 | 10/2002 | Boulos et al. | |
| 2002/0192138 A1 | 12/2002 | Yuill | |
| 2003/0143153 A1 | 7/2003 | Boulos et al. | |
| 2007/0292340 A1 | 12/2007 | Plischke et al. | |

FOREIGN PATENT DOCUMENTS

| | | |
|---|---|---|
| GB | 979564 | 1/1965 |
| GB | 1169282 | 11/1969 |
| GB | 1208027 | 10/1970 |
| JP | 10273777 | 10/1998 |
| WO | WO00/10756 | 3/2000 |
| WO | WO02/086179 | 10/2002 |

* cited by examiner

APPARATUS FOR MAKING METAL OXIDE NANOPOWDER

CROSS-REFERENCE TO RELATED APPLICATIONS

Cross-reference is made to U.S. provisional application No. 60/589,238 filed on Jul. 20, 2004, which is incorporated herein by reference in its entirety.

BACKGROUND OF THE INVENTION

1. Field of the Invention

This invention relates to a reactor for synthesizing nanopowder and more particularly an apparatus for reacting a metal reactant and an oxidizing agent to make nanopowder.

2. Description of the Related Art

The chloride process for making titanium dioxide includes high-temperature anhydrous vapor phase reactions where liquid titanium tetrachloride is vaporized and superheated then reacted with oxygen to produce titanium dioxide. The superheating and subsequent reaction phase can be carried out either by a refractory process, where the reactants are heated by refractory heat exchangers and combined. Alternatively, carbon monoxide can be purified and then mixed with the titanium tetrachloride and oxidizing agent and then the mixture subjected to a controlled combustion. Another method is by vaporizing the titanium tetrachloride in a hot plasma along with the oxidizing agent.

The development of these processes for the production of fine particles which are below about 100 nm in size, termed "nanoparticles", has been a point of focus in recent years. In particular, titanium dioxide nanoparticles have gained increased attention because they can have a high degree of transparency and they can also have UV protective properties. The combined properties of transparency and UV protection is especially desirable in applications demanding both properties including, without limit, cosmetics; product coatings, such as automotive clear coatings and wood coatings; and plastics, such as polymer composites.

The development of processes for making nanoparticles continues to be a challenge.

The build-up of scale within the reactor is a significant problem in the production of metal oxide nanoparticles, particularly titanium dioxide nanoparticles. Scale is a layer of solids formed on the walls of the reactor that can build up significantly overtime as the hot metal oxide particles and reactants collide with the walls of the reactor and stick at a temperature at which the metal oxide particles can coalesce. The layer can comprise sintered metal oxides which are very hard and tenacious. This hard and tenacious type of reactor wall scale is labor intensive to remove and represents loss of product which increases production costs.

In the production of titanium dioxide nanoparticles the presence of "coarse tail" can be a significant problem. "Coarse tail" is an amount of large particles, typically having a diameter exceeding about 100 nm and greater, present in the product. The large particles can be built up from smaller metal oxide particles and/or reactants which collide with each other and coalesce at a high temperatures. In addition, the large particles can result from particle aggregates that can form from partially coalesced particles. Further, a "soft" layer of large coalesced particles that can form on the walls of the reactor can become entrained with the flow of product and contribute to coarse tail.

In the manufacture of titanium dioxide nanoparticles, coarse tail can be a commercialization barrier because it is considered detrimental to transparency. Even a very small percentage of titanium dioxide particles having a diameter above about 100 nm can impart a degree of opacity sufficient to render the product unacceptable for high transparency applications such as automotive clear coatings. Since, large particles can be difficult and costly to remove there is a need for processes capable of producing nanoparticles which are free of coarse tail.

In U.S. Pat. No. 6,277,354 at Col. 4, lines 37-41 this "stickiness" property of metal chlorides and metal oxides which can lead to wall scale and coarse tail is defined as meaning that the ratio of the temperature Kelvin of the particular particles to their melting point temperature Kelvin is equal to or less than about ⅔.

A highly turbulent quench zone has been described for controlling particle size distribution and reactivity to overcome particle growth and agglomeration. Highly turbulent quenching conditions can also provide high conversion rates. While relatively high conversions of reactants can be an advantage of this process, coarse tail and reactor wall scale problems remain. Highly turbulent conditions promote collisions between particles which at high temperatures increase particle coalescence which increases the proportion of large particles and the buildup of reactor wall scale.

SUMMARY OF THE INVENTION

The present invention has been found to achieve particle size control without substantial formation of wall scale by way of an apparatus for synthesizing metal oxide nanoparticles by reaction of metal reactant and an oxidizing agent.

Even when a layer of "dust" does form on the walls of the reactor of this invention, the dust does not sufficiently accumulate to require the reactor to be shut down for cleaning. Further, such dust does not contribute in any substantial way to product coarse tail.

The present invention can significantly reduce and even eliminate coarse tail, that is metal oxide particles which exceed about 100 nm in diameter. Thus, when titanium dioxide is made using the reactor of this invention the titanium dioxide is especially useful for applications requiring a high degree of transparency.

The invention is directed to a tubular flow reactor for synthesis of a metal oxide nanopowder from a metal reactant and an oxidizing agent, comprising:

(a) a first portion of the tubular flow reactor defining a high temperature zone, a second portion of the tubular flow reactor defining an intermediate zone and a third portion of the tubular flow reactor defining a reaction zone, the intermediate zone located between the high temperature zone and the reaction zone, the second portion of the reactor defining the intermediate zone being substantially funnel-shaped and providing a reactant contacting region located adjacent to the reaction zone;

(b) a conduit positioned substantially along the vertical axis of the flow reactor extending through the high temperature zone and terminating adjacent to the reactant contacting region, the conduit being able to direct a flow of the metal reactant into the reactant contacting region;

(c) a sleeve formed about at least a portion of the conduit being able to direct a flow of the oxidizing agent through the high temperature zone to form a flow of hot oxidizing agent which passes into the reactant contacting region wherein the funnel-shape is able to direct the flow of the hot oxidizing agent towards the flow of the metal reactant to form a reaction stream which flows downstream into the reaction zone, whereby the hot oxidizing agent of the reaction stream is able to surround the flow of metal reactant sufficient to prevent the metal reactant from contacting the wall and forming scale on the wall; and (d) a jacket having a first segment formed about at least a portion of the intermediate zone and a second segment formed about at least a portion of the reaction zone, the jacket having a baffle which extends inwardly from the second segment, the baffle being that portion of the tubular reactor which defines at least a portion of the reaction zone, the baffle having an interior surface and an exterior surface, the interior surface of the baffle running alongside the second segment of the jacket, the first segment of the jacket being spaced a distance from the portion of the tubular reactor which defines the intermediate zone and forming an upper cooling fluid conduit, the upper cooling fluid conduit being able to direct the flow of the upper cooling fluid into the reaction zone to flow coaxially with the reaction stream and to form a fluid curtain between the reaction stream and the baffle while the metal reactant and hot oxidizing agent within the reaction stream react to form the metal oxide nanopowder, the fluid curtain being able to prevent scale from forming on the baffle.

BRIEF DESCRIPTION OF THE DRAWINGS

Specific embodiments of the invention are described below with reference to the following drawings.

DETAILED DESCRIPTION OF THE INVENTION

The invention relates to a flow reactor and a process that promotes reaction conditions suitable for avoiding and possibly eliminating the formation of wall scale and coarse tail in the product.

The reactants are contacted in a manner that avoids rapid formation of a well-mixed reaction stream and avoids rapid quenching of the reaction stream. In the present process, the reaction stream is at least initially nonhomogeneous and is gradually cooled within the reaction zone as the metal oxide reaction product forms. While the conversion of metal reactants of the instant invention can be incomplete, typically no greater than about 90%, more typically less than about 85% and still more typically less than about 80% and sometimes as low as about 50 to about 70%, the reaction product coarse tail can be less than about 10% by weight of particles exceeding about 100 nm in diameter, more typically less than about 5% by weight particles exceeding about 100 nm in diameter, still more typically less than about 2% by weight particles exceeding about 100 nm in diameter. Reaction product coarse tail, that is particles exceeding about 100 nm in diameter, can even be eliminated. Coarse tail can be determined by techniques well known in the art of nanoparticle synthesis such as dynamic light scattering.

Because it is easier to separate unreacted material from the reaction product than it is to separate the coarse tail from the reaction product the incomplete conversion of metal reactants of the instant invention does not pose significant production problems.

Additionally, the inner walls of the reaction zone are buffered by a fluid curtain surrounding the reaction stream to prevent the reaction stream or at least the components of it from contacting the reactor walls at temperatures at which the metal oxide particles can coalesce and form wall scale.

The flow reactor of this invention and process of operation described herein utilize high temperature heating that can be provided in a plasma to produce metal oxide nanoparticles. The high temperature heating contemplated provides local temperatures ranging from about 5,000° C. to about 20,000° C. in the plasma gas and from about 500° C. to about 2000° C. in the reaction zone.

Metal oxide nanoparticles are synthesized by bringing an oxidizing agent to an elevated temperature, contacting the hot oxidizing agent with a metal reactant which is at a temperature below the temperature of the oxidizing agent, the hot oxidizing agent providing sufficient heat for reaction to produce a metal oxide.

The flow of the reaction stream comprising hot oxidizing agent and metal reactant has a velocity sufficient for the reaction stream to flow downstream through a reactant contacting region and into a reaction zone at subsonic velocity.

As the reaction stream and cooling fluid flow downstream the reaction stream is cooled as the cooling fluid intermingles with the reaction stream substantially by diffusion until the temperature of the reaction stream is below reaction temperature. This occurs prior to complete metal oxide conversion. Typically, the reaction stream is cooled to below a temperature suitable for oxidation when the metal oxide conversion is at least about 40%, more typically at least about 50% and even more typically at least about 60%.

The rate of cooling is gradual and can be optimized to balance the coarse tail formation against the completeness of the metal oxide conversion. Ideally the percent conversion is sufficient to provide metal oxide nanoparticles product, as withdrawn from the reactor, containing less than about 10% by weight particles exceeding about 100 nm in diameter, more typically less than about 5% by weight particles exceeding about 100 nm in diameter and still more typically less than about 2% by weight particles exceeding 100 nm in diameter.

Figure 1:
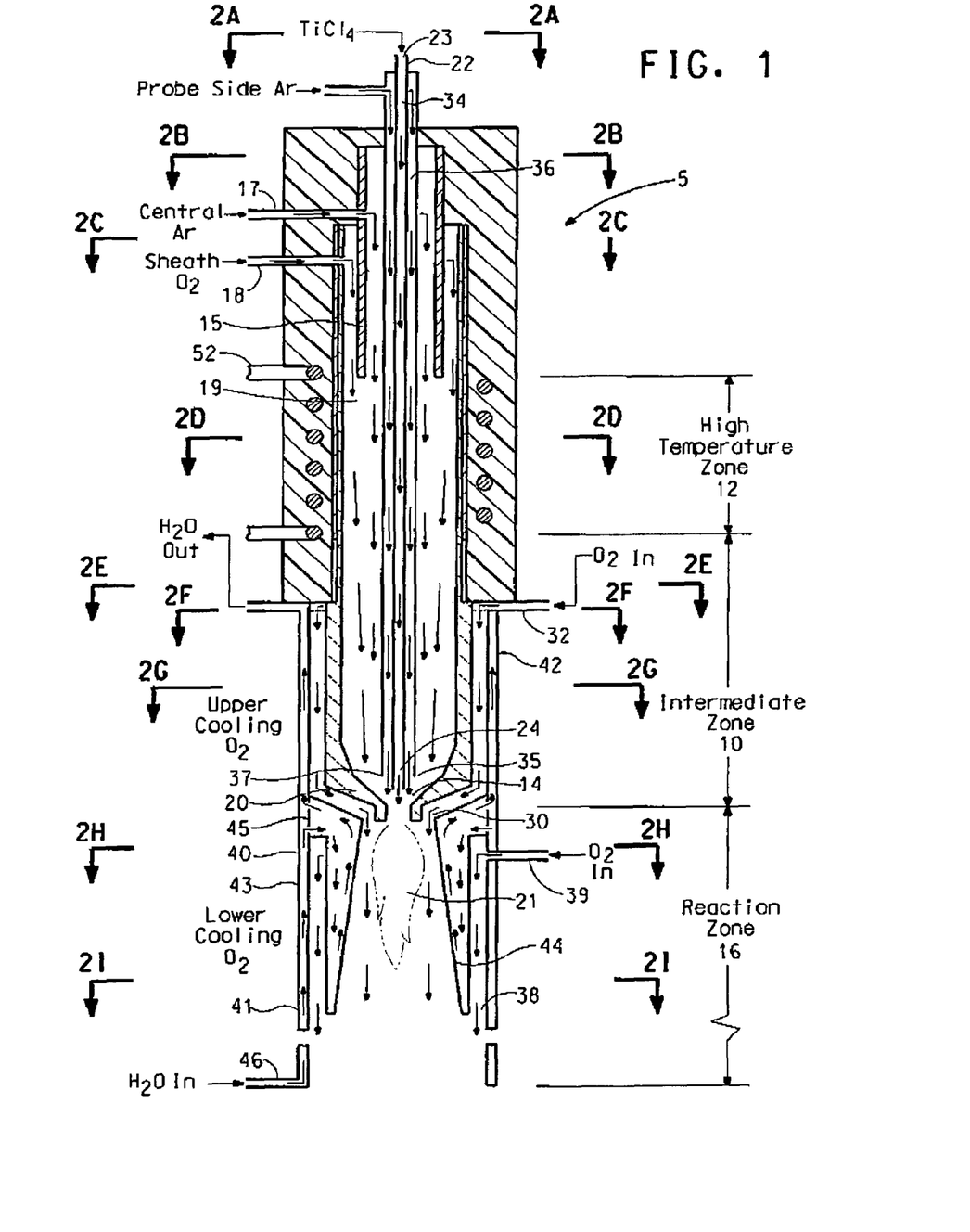
FIG. 1 is a simplified schematic diagram of a flow reactor of the invention.

Referring to the drawings, in FIG. 1 there is a flow reactor 5 vertically disposed and having a generally tubular configuration. A flow reactor can provide continuous production. The high temperature zone typically employs an induction plasma jet assembly. A reaction zone 16 is located downstream of the high temperature zone 12. An intermediate zone 10 is located between the high temperature zone and the reaction zone 16. The intermediate zone terminates in a contacting region 14 which can be substantially funnel-shaped as shown in FIG. 1.

The reactant contacting region 14 receives the flow of metal oxide reactant and provides a region for combining the flows of the metal oxide reactant and hot oxidizing agent heated in the high temperature zone 12 to form a reaction stream. Typically the reaction stream comprises a flow of hot oxidizing agent, a flow of metal reactant and a diffusive flow of the hot oxidizing agent and the metal reactant. More typically the reaction stream comprises the flow of hot oxidizing agent about the flow of metal reactant and a diffusive flow of hot oxidizing agent and the metal reactant located therebetween. More particularly, the diffusive flow is located at a boundary region between the flows of hot oxidizing agent and metal reactant. In the diffusive flow, the molecules of oxidizing agent and metal reactant intermingle substantially because of their spontaneous movement caused by thermal agitation. While flow velocity can also contribute to the intermingling of the reactants, the conditions within the contacting region established by the flows of the hot oxidizing agent and the metal reactant avoid rapid mixing of the reactants. Typically, the conditions within the contacting region comprise laminar or near laminar conditions. A region of high turbulence is created within the reactant contacting region when the metal reactant is directed as a jet into the contacting region but that high turbulence region is surrounded by the laminar or near laminar flow of oxidizing agent. Under such conditions the reactants are able to contact each other substantially by diffusion to form the metal oxide reaction product.

A plasma jet assembly can be utilized as the heating means of the high temperature zone 12. A plasma is a high temperature luminous gas which is at least partially ionized. The plasma used to heat the oxidizing agent is produced by the plasma jet assembly by passing a gas, referred to as a plasma-forming gas, through a high frequency electromagnetic field, such as a radio frequency field. This electromagnetic field should have a power level sufficiently high to cause, by induction, the gas to ionize and thereby produce and sustain the plasma. The plasma-forming gas could be any gas which will ionize when subject to the high frequency electromagnetic field and which remains inert when in the presence of a reactant. Examples of suitable plasma-forming gases include helium, argon, carbon monoxide, oxygen, air or a mixture thereof. By supplying a high frequency electric current to the inductive coil 52 the gas in the high temperature zone 12 is ionized and the plasma is created.

When plasma is used for the high temperature zone the plasma once established may be sustained solely by the flow of oxidizing agent into the high temperature zone 12. In addition, the plasma can be initiated and established by the flow of oxidizing agent. Typically an inert readily ionized plasma-forming gas such as argon initiates the plasma into which the oxidizing agent is introduced.

Plasma generating torches useful in this invention are well known to those skilled in this field.

Figure 2A:
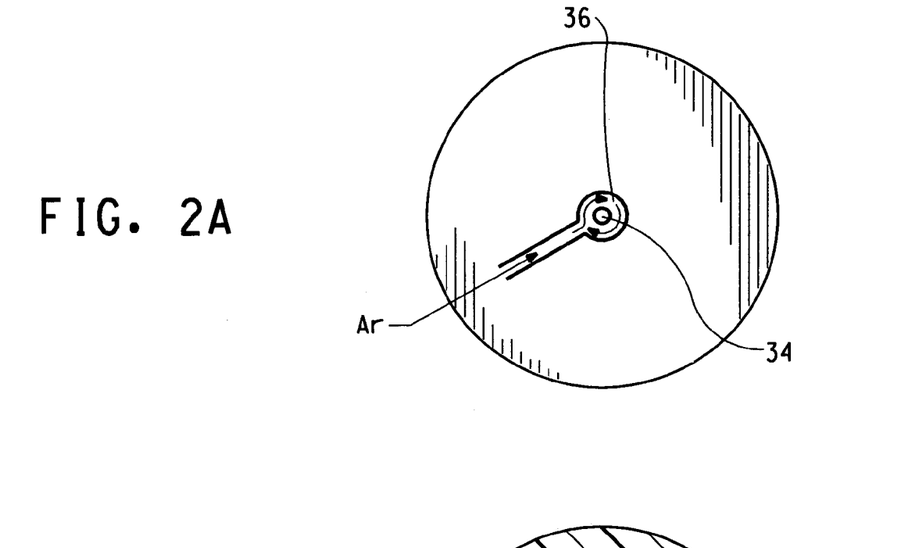
FIG. 2A is a simplified schematic cross-sectional view taken along line 2A-2A of FIG. 1.
Figure 2B:
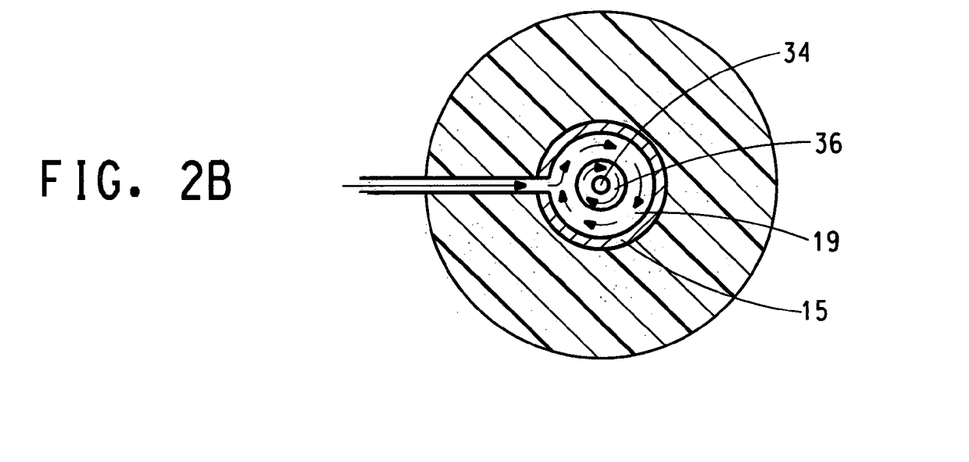
FIG. 2B is a simplified schematic cross-sectional view taken along line 2B-2B of FIG. 1.
Figure 2C:
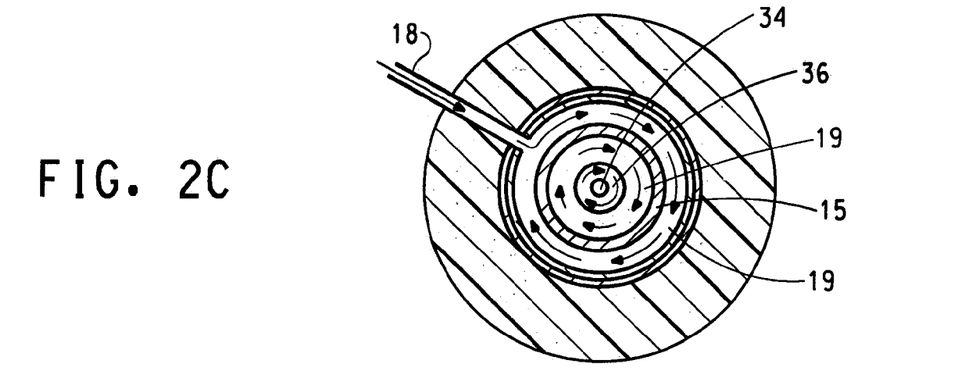
FIG. 2C is a simplified schematic cross-sectional view taken along line 2C-2C of FIG. 1.

Referring to FIG. 1 the plasma-forming gas is introduced into the flow reactor 5 via a plasma-forming gas inlet 17 to initiate and establish the plasma. The oxidizing agent is introduced to the flow reactor via inlet 18. The inlet for the oxidizing agent and flow of oxidizing agent is shown in FIG. 2C. As the oxidizing agent surrounds the plasma and mixes with the plasma it is heated to a very high temperature. Typically the temperature to which the oxidizing agent is elevated ranges from about 500 to about 2000° C. It will be apparent to those skilled in the field that the temperature to which the oxidizing agent is heated may vary depending upon the choice of oxidizing agent, other reactants and the desired reaction product. The oxidizing agent flows downstream through a sleeve 19, formed about at least a portion of a metal reactant feed conduit 22, which directs the flow of oxidizing agent through the high temperature zone 12 and into the reactant contacting region 14. In one embodiment the oxygen flows downwards directed by a sleeve separator 15 which divides an upper portion of the sleeve into two regions above the high temperature zone which serves to keep the flow of the oxidizing agent separate from the flow of the plasma-forming gas. The use of the sleeve separator 15 has been found to be beneficial for establishing the flow of oxidizing agent suitable for the process, keeping the plasma gas within the hottest part of the high temperature zone, providing oxidizing agent sheathing on the walls of the reactor and keeping the temperatures of the walls low. The sleeve separator 15 is also shown in FIG. 2C.

The metal reactant feed conduit 22 is positioned along the vertical axis of the flow reactor 5 passing through the high temperature zone 12 and terminating in the reactant contacting region 14. Because of the configuration of the plasma, the temperature along the central axis bounded by the RF induction coil is cooler relative to regions radially distant from the central axis. The metal reactant feed conduit can be passed through this cooler region of the plasma. Temperatures in this low temperature zone can be readily calculated by those skilled in the art of plasma technology. The metal reactant, typically introduced via a metal reactant feed inlet 23 located in the center of and at the top of the reactor, flows through the metal reactant feed conduit to the reactant contacting region 14. The outlet for the metal reactant feed is located upstream from and adjacent to the reactant contacting region.

In one embodiment of the invention the metal reactant feed conduit 22 comprises concentric tubes having an inner tube 34 having a tip 35 and an outer tube 36 having a tip 37; the inner tube for conveying the metal reactant optionally together with a carrier gas, such as argon, into the reactant contacting region and the outer tube for conveying a supplemental fluid into the reactant contacting region. The supplemental fluid can be a reactant or inert fluid, a coolant, adjuvant or dopant. Examples of suitable supplemental fluids include water or co-metal reactants including without limitation aluminum, silicon, cesium, manganese, vanadium or tin. FIG. 2A shows the inlet of the outer tube 36 for conveying the supplemental fluid and the inner tube 34.

In one embodiment the tip of the outer tube 37 is recessed from the tip of the inner tube 35 which is especially useful when a fluid is passed through the outer tube and flows about the tip of the inner tube sufficient to prevent scale from forming on the tip of the conduit and, additionally, into the reactant contacting region and, additionally, into the reaction zone. With this configuration the tip of the inner tube can be maintained substantially free of scale, preferably completely free of scale. A typical fluid is oxygen or argon gas.

Figure 3:
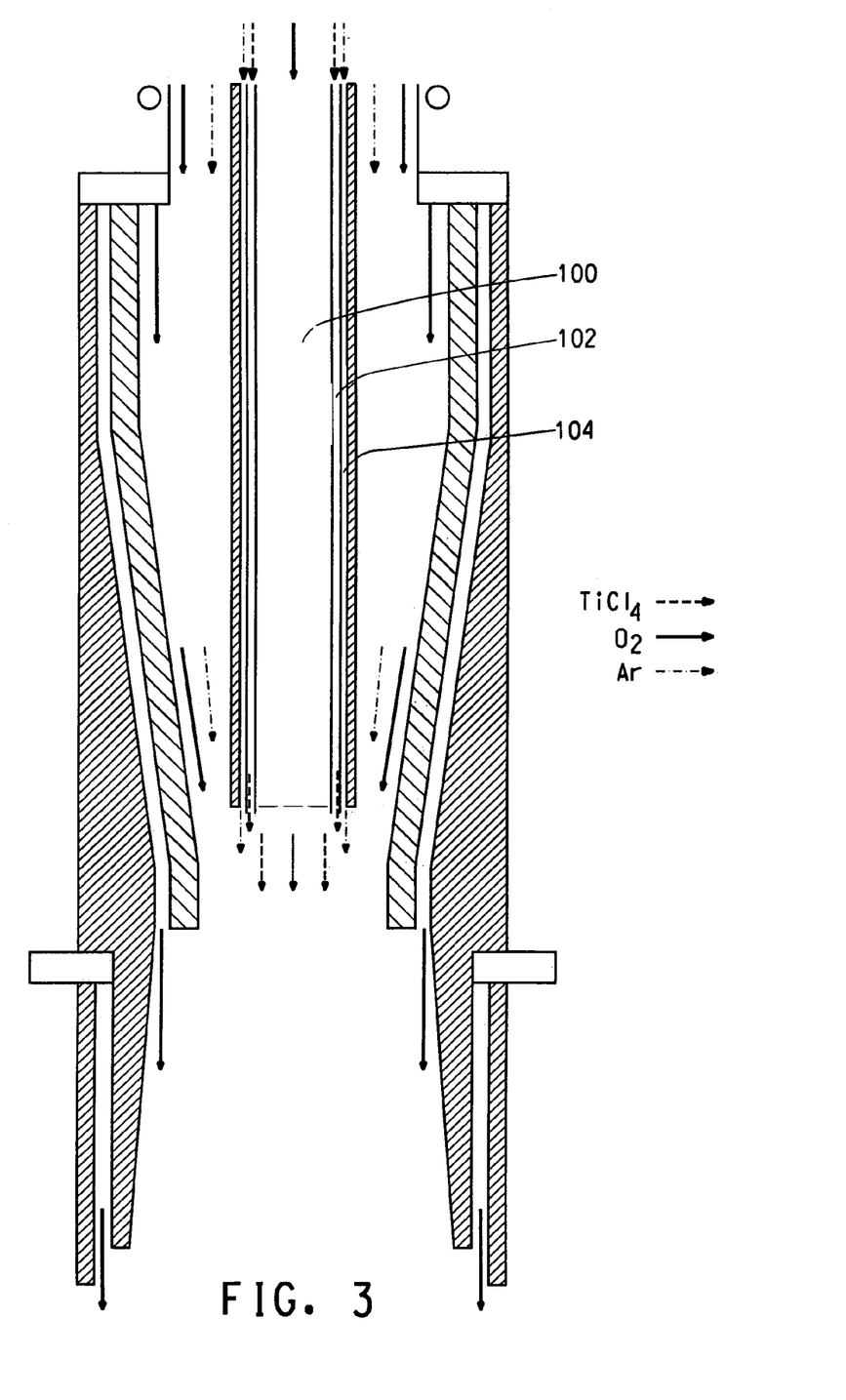
FIG. 3 is a simplified schematic diagram of a conduit of the invention.
Figure 4:
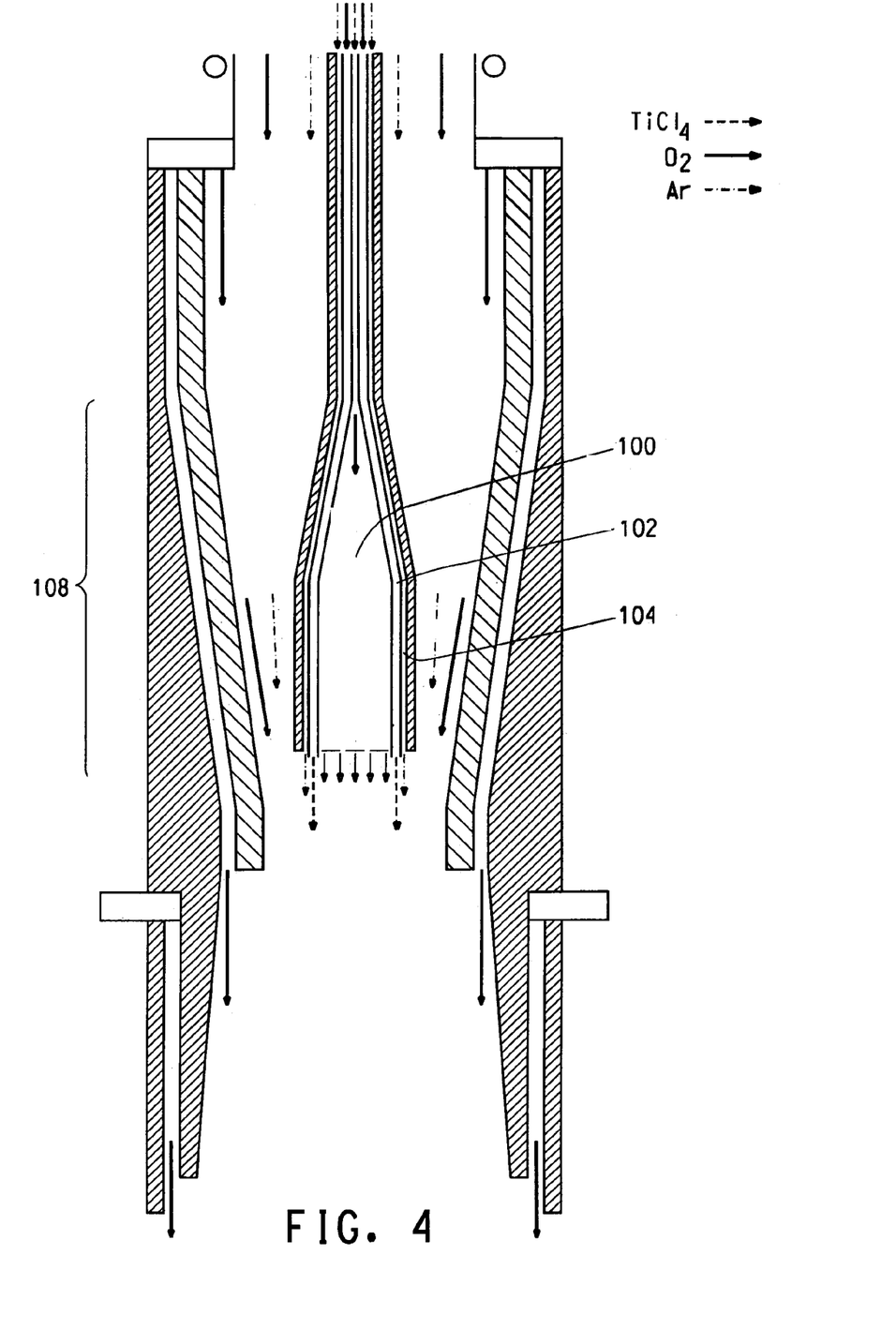
FIG. 4 is a simplified schematic diagram of an alternative conduit of the invention.

In one embodiment, to increase throughput, the metal reactant feed conduit is configured so that the metal reactant is conveyed through an annulus about a central channel. As shown in FIG. 3, the metal reactant feed conduit can also comprises a central channel 100 through which a fluid such as oxygen can flow, a metal reactant annulus 102 through which the metal reactant can flow, an inert gas annulus 104 through which an inert fluid such as argon can flow. Optionally the metal reactant feed conduit can have a water jacket about its perimeter for cooling. As shown in FIG. 4, to minimize heat loss while permitting increased throughput an expanded region 108 of the metal reactant feed conduit can be located below the high temperature zone.

The metal reactant feed can be introduced into the flow reactor in liquid or vapor form. Typically, the metal reactant is vaporized prior to being introduced to the flow reactor. The metal reactant can be vaporized by any of various techniques well known in the metal vaporization art.

The intermediate zone 10 allows the oxidizing agent to heat by mixing with the plasma-forming gas (recognizing that some amount of mixing of the plasma-forming gas and the oxidizing agent can occur in the high temperature zone). The intermediate zone can also establish a laminar or near laminar flow profile of the oxidizing agent and coaxial flow with the metal reactant. In a lower portion of the intermediate zone the gases cool sufficiently to no longer be in the plasma state.

When the metal reactant flows from the outlet of the metal reactant feed conduit 24 it meets the flow of hot oxidizing agent and together they form a reaction stream which flows generally in a direction downstream towards the reaction zone. While the metal reactant flowing from the conduit can be a jet resulting in a region of high turbulence, the mixing of the reactants is substantially by diffusion, not turbulence, since the flows meet substantially parallel to each other. Certain configurations of the contacting region, for example without limitation, when a funnel-shaped contacting region is employed, may cause at least a portion of the flows to meet at a slight angle depending upon the flow velocity of the hot oxidizing agent and/or the shape of the contacting region and thus the flows may not meet completely in parallel to each other. However, such conditions in the contacting region facilitate mixing substantially by dispersion without inducing highly turbulent conditions which would promote rapid mixing which can promote coarse tail and scale formation. A configuration that promotes a highly turbulent condition and rapid mixing within the contacting region such as a jet of oxidizing agent introduced substantially perpendicular to the jet of metal reactant is avoided.

A funnel-shaped reactant contacting region 14 can be utilized to direct the flow of oxidizing agent towards the flow of the metal reactant and into the reaction zone 16.

In the reactant contacting region 14 and even in the upper region of reaction zone, the nonhomogeneous reactant stream can be characterized by a high concentration of metal reactant located along the vertical axis of the reactant contacting region, a boundary region of a diffusive flow in which the molecules of oxidizing agent and metal reactant intermingle, a high concentration of hot oxidizing agent surrounding the boundary region and at the outermost region of the reaction stream.

The high concentration of hot oxidizing agent at the outermost region of the reaction stream can form a fluid curtain surrounding the reaction stream which can prevent coalesceable material in the reaction stream from contacting the walls of the reactant contacting region to keep the walls substantially free of wall scale, preferably completely free of wall scale. More particularly the fluid curtain of hot oxidizing agent can buffer the inner walls of the reactant contacting region.

The temperature of the metal reactant is lower than the temperature of the oxidizing agent. Typically the temperature of the metal reactant as it emerges from the outlet ranges from about 100 to about 200° C., the hot oxidizing agent providing sufficient heat for reaction.

Typically the flow velocities within the flow reactor are subsonic. The local flow velocities of the oxidizing agent in the high temperature zone range from about 100 to about 400 ft/s. The local flow velocities of the metal reactant as it emerges into the reactant contacting region range from about 100 ft/s to about 600 ft/s. The local flow velocities of the reaction stream within a lower portion of the reaction zone range from about 100 to about 2000 ft/s.

The metal oxide reaction product can start to form in the reactant contacting region 14. However, the conditions of the process are such that the highest metal oxide conversion occurs in the reaction zone 16, downstream from where the reactant flows initially meet, and typically at about the middle of the reaction zone.

Figure 2D:
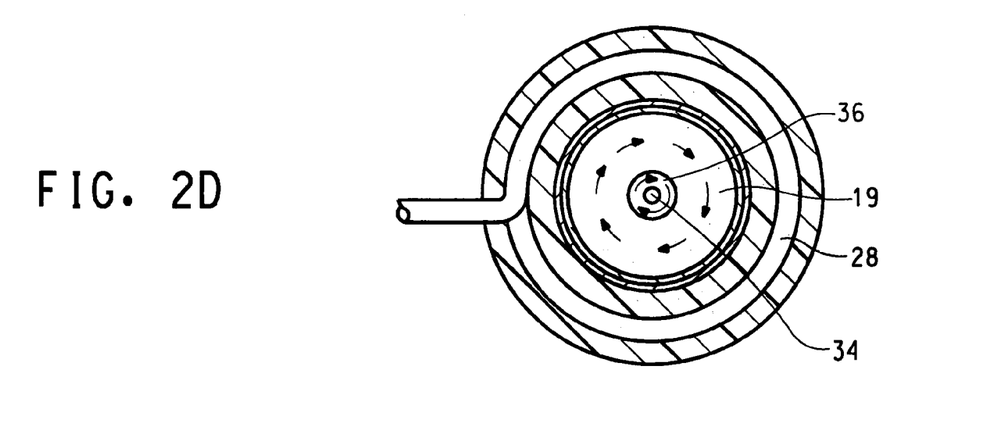
FIG. 2D is a simplified schematic cross-sectional view taken along line 2D-2D of FIG. 1.
Figure 2E:
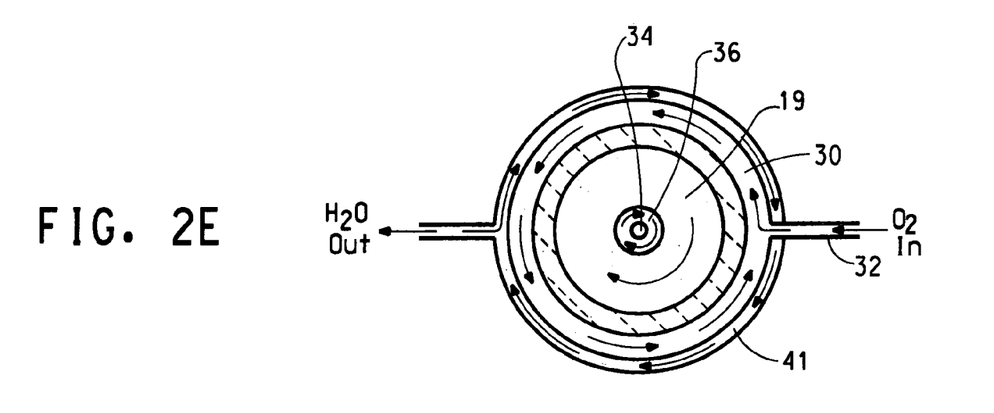
FIG. 2E is a simplified schematic cross-sectional view taken along line 2E-2E of FIG. 1.
Figure 2F:
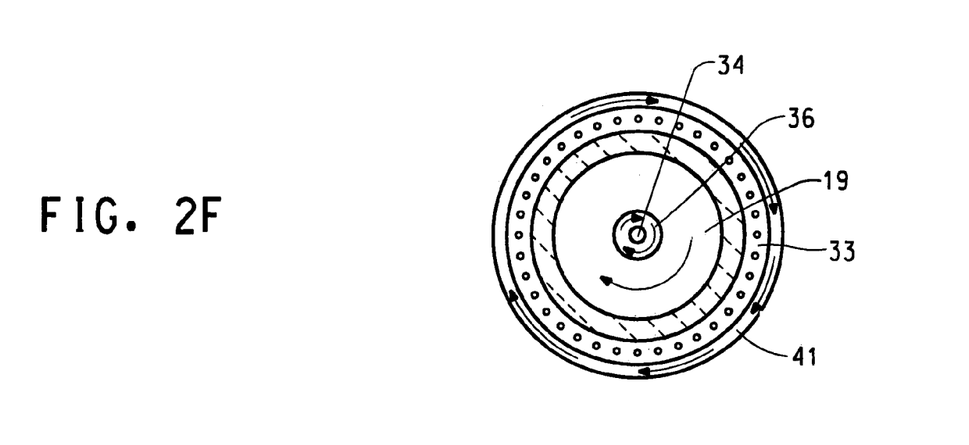
FIG. 2F is a simplified schematic cross-sectional view taken along line 2F-2F of FIG. 1.
Figure 2G:
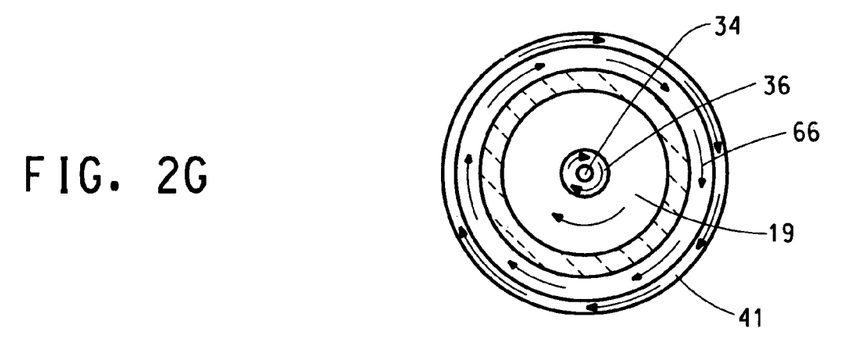
FIG. 2G is a simplified schematic cross-sectional view taken along line 2G-2G of FIG. 1.
Figure 2H:
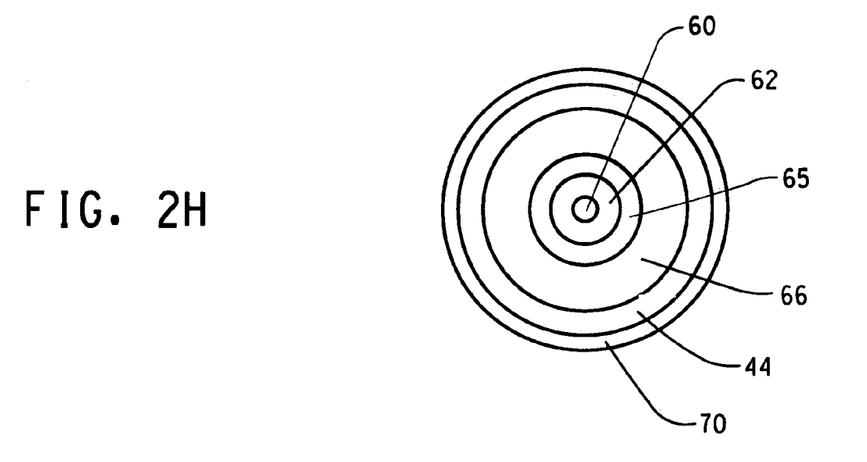
FIG. 2H is a simplified schematic cross-sectional view taken along line 2H-2H of FIG. 1.
Figure 2I:
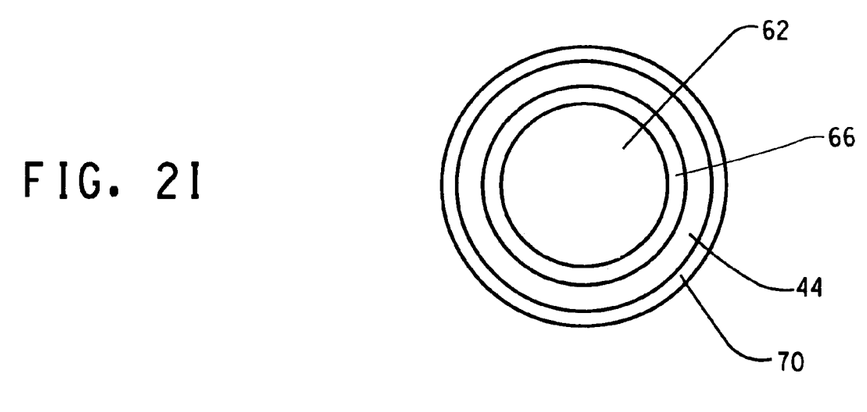
FIG. 2I is a simplified schematic cross-sectional view taken along line 2I-2I of FIG. 1.

FIGS. 2H and 2I are greatly simplified for ease of understanding the flows within the reaction zone and do not limit the scope of the invention. Referring to FIG. 2H, a high concentration of metal reactant 60 is clustered about the vertical axis of the reactor. The stream of metal reactant is surrounded by a diffusive flow 62 comprising the hot oxidizing agent, metal reactant and metal oxide product which is surrounded by a flow of hot oxidizing agent 65 which is, typically, substantially free of metal reactant and more typically free of metal reactant. The flow of upper cooling fluid 66 surrounds the flow of hot oxidizing agent and is bounded by the baffle 44. The space for the lower cooling fluid 70 is bounded on a first side by the baffle 44 and on a second side by the water jacket 41 shown in FIGS. 1, 2E, 2F and 2G. In contrast, in the lower region of the reaction zone, shown in FIG. 2I, because of the increased opportunities for the hot oxidizing agent and the metal reactant to intermingle with each other through diffusion, the rate of which increases as the reaction stream flows downstream, the concentration of metal reactant is reduced and the concentration of metal oxide reaction product is increased. Thus, as shown in FIG. 2I, the reaction stream comprises the diffusive flow 62 surrounded by the upper cooling fluid 66 which is bounded by the baffle 44. The space for the lower cooling fluid 70 is still bounded on a first side by the baffle 44 and on a second side by the water jacket 41 shown in FIG. 1. Conversion to metal oxide product can be highest in this lower region of the reaction zone. However, metal oxide conversion slows as the reaction stream comes into contact with the lower cooling fluid passing into the reaction zone via the lower cooling fluid outlet 38.

Thus, a significant amount of metal oxide conversion occurs in the reaction zone 16, downstream from where the reactant flows initially meet, and after an upper cooling fluid is introduced to the reaction zone.

The temperature across the reaction zone is not constant. The reaction zone contains a relatively cool upper cooling fluid as well as a nonhomogeneus reaction stream, the streams flowing substantially parallel to each other. Not only do the reaction stream and upper cooling fluid flow as substantially discrete streams but there are localized areas comprising various mixtures of the components (comprising upper cooling fluid, hot oxidizing agent, metal reactant and metal oxide reaction product) and localized areas of unmixed components also flowing as substantially discrete streams having different temperatures. The average of the temperatures within the reaction zone can cover a wide range, typically from about 200° C. to about 2000° C. It has also been found through computer modeling that the flow rates are not uniform across the reaction zone. Working from the top of the reaction zone to the bottom, the highest flow rates occur at the outlet of the funnel and the lowest flow rates are at the bottom of the reaction zone. Working from the inner wall of the reaction zone towards the center the lowest flow rate is closest to the inner wall and the highest is along the vertical axis of the reaction zone.

In one embodiment, the flow reactor comprises a typical plasma jet assembly to which an extender pipe 40 is mounted. The extender pipe 40 provides a jacket 41, typically a water jacket, and a nozzle through which the reactant stream and upper cooling fluid pass into the reaction zone 16. The water jacket has a first segment 42 and a second segment 43 and a baffle 44. The water jacket provides continuous or semicontinuous flow of cool water about a lower portion of the flow reactor, for cooling. The cooling water is introduced to the first segment via inlet 46 at a flow rate such that it flows upwards towards the plasma, and is directed down into the baffle by a diverter 45. The water then flows out of the baffle and is directed by the diverter 45 into a first segment flowing towards the plasma and carrying heat away from the reaction zone 16. Any suitable coolant may be used. Water or another liquid coolant is especially useful because it will conform to the flow path design of the water jacket. Cooling may also be effectively provided by water cooling coils.

In a typical embodiment, a cooling fluid, typically a gas, such as oxygen gas is introduced to the reaction zone to provide a flow of cooling fluid simultaneously with and in a direction substantially coaxial to the reaction stream for cooling under low turbulence. The cooling fluid can be introduced as a laminar or near laminar flow. Typically, a plurality of cooling fluid inlets are positioned along the length of the reaction zone to introduce cooling fluid to the reaction stream as it travels downstream.

The Reynolds Number of a near laminar flow is typically is in the range of about 2000 to about 4000. The Reynolds Number of a laminar flow would be less than 2000. For the sake of comparison, highly turbulent flow would be greater than about 5000.

Referring to FIG. 1 there is shown where the cooling fluids can be introduced in two locations of the extender pipe 40. An upper cooling fluid inlet 32 is above the outlet of the metal reactant feed conduit 24 and just below the high temperature zone 12. FIGS. 2E and 2F show an upper cooling fluid inlet 32. A perforated ring 33 through which the upper cooling fluid can flow is shown in FIG. 2F. A perforated ring can be used about any region where one or more of the cooling fluids are introduced to the reactor. A perforated ring is best shown in FIG. 2F. The perforated ring can be used to facilitate an even flow distribution of cooling fluid into the reactor.

The upper cooling fluid flows downwards between the first segment 42 of the water jacket 41 and the outer wall of the reactant contacting region 14 and then is discharged via outlet 30 to flow co-current with the reaction stream into the reaction zone. The temperature of the upper cooling fluid is typically around room temperature.

The lower cooling fluid inlet 39 permits a lower cooling fluid to flow downwards between the second segment 43 of the water jacket 41 and the baffle 44. Below the baffle 44 the cooling fluid is discharged so that it flows co-current together with the reaction stream through at least a portion of the reaction zone. The temperature of the lower cooling fluid is typically around room temperature.

The cooling fluid more particularly serves to keep the components of the reaction stream away from the walls of the reaction zone and to keep the walls of the reaction zone at a temperature below the temperature at which the components of the reactant stream will stick to the walls if they do contact the walls. This keeps the walls substantially free of wall scale, preferably completely free of wall scale. Thus, the cooling fluid can form a fluid curtain surrounding the reaction stream to buffer the inner walls of the reaction zone.

The flow reactor typically operates continuously. The metal oxide particles formed in the reaction zone can be captured by any suitable technique such as by way of a filter. Gas-phase products of reaction and reactants can be scrubbed and treated by any suitable technique. Scrubbing and treating techniques are well known in the art.

The nanoparticles produced by this invention generally contains particles (agglomerates) less than 100 nm in diameter, which can provide many different useful properties (electronic, optical, electrical, magnetic, chemical, and mechanical), making them suitable for a wide variety of industrial applications. The surface area of the nanoparticles can range from about 20 m$^2$/g to about 200 m$^2$/g. The particle size uniformity is suitable for nanoparticles applications. Typically, the particle size distribution $d_{10}$ can range from about 10 to about 30, $d_{50}$ from about 30 to about 60 and $d_{90}$ from about 60 to about 90.

It is contemplated that this invention will be suitable for production of a wide variety of metal oxide nanoparticles in addition to titanium dioxide, including, without limit, $SiO_2$, $ZrO_2$, $ZnO$, $CeO_2$, and $Al_2O_3$. Any metal reactants capable of forming the desired metal oxides may be employed including, without limit, a metal halide such as titanium tetrachloride, or an organo metallic such as an organo titanate. Examples of oxidizing agents include, without limit, oxygen, air, or water.

Working downwards from the top of the flow reactor shown in FIG. 1 the point of introduction of the various materials into the flow reactor of one embodiment of the invention is shown. The metal reactant, which can be titanium tetrachloride, is fed into the reactor through an inlet 23 positioned at the center of the reactor that is shown in FIG. 1. FIG. 2A shows introduction of argon gas about the metal reactant conduit. At the point of introduction, the flow rate of the metal reactant can range from about 10 to at least about 240 grams per minute (gram/m), as shown in the example the flow rate was about 10 gram/m and the temperature can range from about 20 to at least about 200° C. Argon gas is fed into the outer annular conduit 36 that is shown in FIGS. 1 and 2A. At the point of introduction, the flow rate of the argon gas can range from about 10 sl/m to about 100 sl/m as shown in the example the flow rate was about 27 sl/m and the temperature can be at about room temperature. The plasma-forming gas, which is typically argon is fed into the reactor from a plasma-forming gas inlet 17 that is shown in FIGS. 1 and 2B. At the point of introduction, as shown in the example, the flow rate of the plasma-forming gas was about 30 sl/m and the temperature can be at about room temperature. The oxidizing agent which is typically oxygen but can be air is fed into the reactor through an oxidizing agent inlet 18 that is shown in FIGS. 1 and 2C. At the point of introduction, the flow rate of oxygen, as shown in the example was about 300 sl/m and the temperature can be at about room temperature. The upper cooling fluid which is typically oxygen but can be air is fed into the reactor through an upper cooling fluid inlet 32 as shown in FIGS. 1 and 2E. FIG. 2G shows the space for the upper cooling fluid inside the water jacket 41. FIG. 2H, simplified for exemplification, shows the upper cooling fluid 66 flowing as a distinct stream between the baffle 44 and the diffusive flow 62. At the point of introduction, the flow rate of the upper cooling fluid can range from about 100 sl/m to about 800 sl/m as shown in the example the flow rate was 440 sl/m and the temperature can be at about room temperature. The lower cooling fluid which is typically oxygen but can be air is fed into the reactor through side inlet 39 as shown in FIG. 1. The lower cooling fluid is passed into the flow reactor via outlet 38. FIG. 2I shows the space for the lower cooling fluid 70 located between the baffle 44 and the water jacket 41. At the point of introduction, the flow rate of the lower cooling fluid can range from about 100 sl/m to about 800 sl/m as shown in the example the flow rate was 440 sl/m and the temperature can be at about room temperature. The cooling water is fed into the water jacket of the flow reactor through cooling water inlet 46 shown in FIG. 1.

The flow reactor can be made of stainless steel, which is usually water cooled or a corrosion resistant material such as an Ni/Fe alloy. The metal reactant feed conduit 22 can be made from a corrosion resistant material capable of withstanding high temperature oxidizing conditions and the presence of chlorine, such as an nickel-chromium-iron alloy (inconel alloy) which can have a concentric outer conduit that can be made of stainless steel and may be water-jacketed for cooling. The outer wall of the high temperature zone can be water-jacketed for cooling with the inner wall into which the RF induction coils 28 are embedded, see FIG. 2D, made of a ceramic material resistant to high temperatures. A quartz sleeve separator 15 can be mounted above the induction coils of the high temperature zone for conveying the plasma-forming gas into the high temperature zone. A wall which forms the reactant contacting region 14 and at least a portion of the sleeve 19 can be made of a boron-nitride material and can be mounted directly onto a typical plasma jet assembly.

In one embodiment, the invention herein can be construed as excluding any element or process step that does not materially affect the basic and novel characteristics of the composition or process. Additionally, the invention can be construed as excluding any element or process step not specified herein as being part of the invention.

EXAMPLES

Test Procedures Referenced in the Examples

Surface Area

The BET specific surface area of a sample made according to the Examples is defined as the surface area of one gram of particles. It is defined by the formula:

$$S = 6/(Dia)(Den)$$

wherein

S is the specific surface area in square meters per gram,

Dia is the average particle diameter in meters; and

Den is the density of the particles in grams per cubic meters.

The surface area can be determined by gas absorption (such as $N_2$) or by determining the average particle size by use of an electron microscope and then using such particle size to calculate the surface area by use of the above formula. Additional information regarding determining the specific surface area is set forth in T.P. Patton Paint Flow and Pigment Dispersion, 1979, John Wiley and Son, Inc. and ASTM Method C1274.

UPA Particle Size Distribution

The particle size distribution of the particles formed in the Examples, and shown in Table 1, were measured using the ultrafine particle analyzer dynamic light scattering technique. The MICROTRAC ULTRAFINE PARTICLE ANALYZER (UPA) (a trademark of Leeds and Northrup, North Wales, Pa.) uses the principle of dynamic light scattering to measure the particle size distribution of particles in liquid suspension. The measured size range is 0.003 µm to 6 µm (3 nm to 6000 nm). The dry particle sample needs to be prepared into a liquid dispersion to carry out the measurement. An example procedure is as follow:

(1) Weigh out 0.08 g dry particle.

(2) Add 79.92 g 0.1% tetrasodium pyrophosphate (TSPP) solution in water to make a 0.1 wt. % suspension of particles.

As described in the following Examples, the gas phase process and operating conditions of the present invention were employed in a pilot scale plasma reactor operating at a rate of 3 g/min of titanium dioxide in which the titanium dioxide nanoparticles produced are considered to provide design data for large scale production.

Example 1

Oxygen gas flowing at 300 standard liters per minute (slpm) and a temperature of 20° C. was introduced to a sleeve 19 of the flow reactor 5 through the oxidizing agent inlet 18 upstream of the high temperature zone. Argon gas flowing at 30 slpm, temperature of 20° C., was introduced to a central channel via the plasma-forming gas inlet 17 to form the hot plasma. Local plasma temperatures exceed 10,000° C. In the high temperature zone, the high temperature plasma mixed with the oxygen to form a hot gas mixture that flowed downwards through the high temperature zone 12 towards the reaction contacting region. The temperature of the oxygen and argon gas mixture in the reaction zone was 1000 to 3000° C. The argon and oxygen gases had a near laminar flow.

$TiCl_4$ vapor flowing at 10 gram/min at a temperature of 140° C. mixed with argon gas flowing at 10 slpm was introduced into the center of the flow reactor 5 via a ⅛-inch ID inner tube 34. Argon gas flowing at 27 slpm was introduced into the outer tube 36. The $TiCl_4$ vapor and argon gas outlets of the metal reactant feed conduit 22 located adjacent to the reaction contacting region introduced the $TiCl_4$ to the hot mixture of oxygen and argon flowing from the high temperature zone. In the reaction zone 16 $TiCl_4$ reacted with oxygen to form $TiO_2$ particles and $Cl_2$ gas. The reaction zone extended approximately six inches (152.4 mm) downstream of the $TiCl_4$ and argon gas outlets and the inside diameter of the reactor in the reaction zone expanded from 30 to 80 mm.

An extender pipe 40 comprising a water jacket 41 for circulating cooling water about the flow reactor down stream of the high temperature zone was mounted to the bottom of the plasma jet assembly. The water flowed into the water jacket 41 at a temperature of 20° C.

Oxygen gas was introduced below the high temperature zone 12 at two locations. The upper location was above the outlet of the metal reactant feed conduit 24 and just below the high temperature zone 12. The lower location was below the reactant contacting region 14.

In the upper location the $O_2$ was introduced temperature 20° C. through the upper cooling fluid inlet 32 at 440 slpm and flowed co-current together with the reactants into the reaction zone 16.

In the lower location the cool $O_2$ temperature 20° C. was introduced through lower inlet 39 at 440 slpm and flowed co-current together with the reactants in the reaction zone 16.

The cooled $TiO_2$ particles were captured in a filter and collected after the first hour and after the second hour of a two-hour period of continuous operation. The properties of the resulting $TiO_2$ powder are listed in Table 1. As shown in Table 1, the coarse tail (weight percent particles greater than 104 nm) was less than 5 wt. % for both samples and the mean particle size ($d_{50}$) was 44 and 41 nm, respectively. $TiCl_4$ conversion (yield) was 56 and 58%.

No scale was detected. An acceptable light dust was observed on the interior of the reactor.

TABLE 1

| powder collection | powder average surface area by BET ($m^2/g$) | particle size data by dynamic light scattering particle size distribution by weight in nanometers | | | | | |
|---|---|---|---|---|---|---|---|
| | | $d_{10}$ | $d_{50}$ | $d_{90}$ | wt % > 52 | wt % > 104 | wt % > 208 |
| Hour 1 | 101.2 | 30 | 44 | 79 | 34.0 | 4.6 | 1.7 |
| Hour 2 | 114.1 | 27 | 41 | 76 | 28.6 | 4.2 | 1.4 |

The description of illustrative and preferred embodiments of the present invention is not intended to limit the scope of the invention. Various modifications, alternative constructions and equivalents may be employed without departing from the true spirit and scope of the appended claims.

What is claimed is:

1. A tubular flow reactor for synthesis of a metal oxide nanopowder from a metal reactant and an oxidizing agent, comprising:
   (a) a first portion of the tubular flow reactor defining a high temperature zone, a second portion of the tubular flow reactor defining an intermediate zone and a third portion of the tubular flow reactor defining a reaction zone, the intermediate zone located between the high temperature zone and the reaction zone, the second portion of the reactor defining the intermediate zone being substantially funnel-shaped and providing a reactant contacting region located adjacent to the reaction zone;
   (b) a conduit positioned substantially along the vertical axis of the flow reactor extending through the high temperature zone and terminating adjacent to the reactant contacting region, the conduit being able to direct a flow of the metal reactant into the reactant contacting region;
   (c) a sleeve formed about at least a portion of the conduit being able to direct a flow of the oxidizing agent through the high temperature zone to form a flow of hot oxidizing agent which passes into the reactant contacting region wherein the funnel-shape is able to direct the flow of the hot oxidizing agent towards the flow of the metal reactant to form a reaction stream which flows downstream into the reaction zone, whereby the hot oxidizing agent of the reaction stream is able to surround the flow of metal reactant sufficient to prevent the metal reactant from contacting the wall and forming scale on the wall; and
   (d) a jacket having a first segment formed about at least a portion of the intermediate zone and a second segment formed about at least a portion of the reaction zone, the jacket having a baffle which extends inwardly from the second segment, the baffle being that portion of the tubular reactor which defines at least a portion of the reaction zone, the baffle having an interior surface and an exterior surface, the interior surface of the baffle running alongside the second segment of the jacket, the first segment of the jacket being spaced a distance from the portion of the tubular reactor which defines the intermediate zone and forming an upper cooling fluid conduit, the upper cooling fluid conduit being able to direct the flow of the upper cooling fluid into the reaction zone to flow coaxially with the reaction stream and to form a fluid curtain between the reaction stream and the baffle while the metal reactant and hot oxidizing agent within the reaction stream react to form the metal oxide nanopowder, the fluid curtain being able to prevent scale from forming on the baffle.

2. The apparatus of claim 1 further comprising a plasma jet assembly to form a plasma in the high temperature zone.

3. The apparatus of claim 1 in which the conduit comprises concentric tubes the inner tube being able to direct the flow of the metal reactant and the outer tube being able to direct the flow of a supplemental fluid into the reactant contacting region.

4. The apparatus of claim 1 in which the conduit comprises concentric tubes, an inner tube of the concentric tubes having a tip and being able to direct the flow of the metal reactant into the reactant contacting region, an outer tube of the concentric tubes having a tip, the tip of the outer tube being recessed from the tip of the inner tube, the outer tube being able to direct a flow of a coolant about the tip of the inner tube sufficient to prevent scale from forming on the tip of the inner tube.

5. The apparatus of claim 1 in which the jacket is a water jacket capable of directing a flow of cooling water to facilitate cooling of the second and third portions of the tubular reactor.

6. The apparatus of claim 1 further comprising a particle collector located downstream of the reaction zone for collecting the cooled metal oxide nanopowder from the reaction stream.

7. The apparatus of claim 1 in which the baffle is spaced away from the second segment of the jacket to form a lower cooling fluid conduit being able to direct a flow of a lower cooling fluid into the reaction zone for cooling the reaction stream.

8. The apparatus of claim 1 in which the conduit comprises a central channel being able to convey a fluid and an annulus located about the central channel the annulus being able to convey the metal reactant.

9. The apparatus of claim 8 in which a first portion of the conduit extending through the high temperature zone is narrower in diameter than the diameter of the portion of the conduit terminating adjacent to the reactant contacting region.

* * * * *